United States Patent
Jabado et al.

(10) Patent No.: US 7,811,662 B2
(45) Date of Patent: Oct. 12, 2010

(54) PROCESS FOR APPLYING MATERIAL TO A COMPONENT, A FIBER AND A FIBER MAT

(75) Inventors: Rene Jabado, Berlin (DE); Ursus Krüger, Berlin (DE); Daniel Körtvelyessy, Berlin (DE); Ralph Reiche, Berlin (DE); Michael Rindler, Schöneiche (DE); Steffen Walter, Harthausen (DE)

(73) Assignee: Siemens Aktiengesellschaft, Munich (DE)

( * ) Notice: Subject to any disclaimer, the term of this patent is extended or adjusted under 35 U.S.C. 154(b) by 1230 days.

(21) Appl. No.: 11/396,421

(22) Filed: Mar. 31, 2006

(65) Prior Publication Data

US 2006/0263624 A1 Nov. 23, 2006

(30) Foreign Application Priority Data

Mar. 31, 2005 (EP) ................................. 05007095

(51) Int. Cl.
*D04H 1/00* (2006.01)
*B32B 15/00* (2006.01)

(52) U.S. Cl. ..................... 428/292.1; 428/615
(58) Field of Classification Search ........................ None
See application file for complete search history.

(56) References Cited

U.S. PATENT DOCUMENTS

| 3,876,447 A | 4/1975 | Lally |
| 3,970,136 A * | 7/1976 | Cannell et al. ............... 164/108 |
| 4,059,712 A | 11/1977 | Bothwell |
| RE31,589 E * | 5/1984 | Phoenix et al. ................. 75/27 |
| 5,267,601 A * | 12/1993 | Dwivedi ...................... 164/97 |
| 5,323,954 A | 6/1994 | Shetty et al. |
| 5,358,674 A | 10/1994 | Rabe |
| 5,366,943 A | 11/1994 | Lipowitz et al. |
| 5,666,643 A | 9/1997 | Chesnes et al. |
| 5,945,362 A | 8/1999 | Ishikawa et al. |
| 6,024,792 A | 2/2000 | Kurz et al. |
| 6,241,469 B1 | 6/2001 | Beeck et al. |
| 2003/0196305 A1 | 10/2003 | Kebbede et al. |

FOREIGN PATENT DOCUMENTS

| EP | 0 412 397 A1 | 2/1991 |
| EP | 0 486 489 B1 | 5/1992 |
| EP | 0 786 017 B1 | 7/1997 |
| EP | 0 892 090 A1 | 1/1999 |
| EP | 1 055 480 A2 | 11/2000 |
| EP | 1 204 776 B1 | 5/2002 |
| EP | 1 306 454 A1 | 5/2003 |
| EP | 1 319 729 A1 | 6/2003 |
| GB | 1076958 | 7/1967 |
| WO | WO 99/67435 | 12/1999 |
| WO | WO 00/44949 | 8/2000 |

* cited by examiner

*Primary Examiner*—Ula C Ruddock
*Assistant Examiner*—Camie S Thompson (57) ABSTRACT

Short fibers in a solder or a welding material often do not have the desired strength.

The invention uses fiber mats (13) which have been introduced onto a surface (10) or into a recess (7) of a metallic component.

14 Claims, 7 Drawing Sheets

PROCESS FOR APPLYING MATERIAL TO A COMPONENT, A FIBER AND A FIBER MAT

CROSS REFERENCE TO RELATED APPLICATIONS

This application claims the benefits of European Patent application No. 05007095.2 filed Mar. 31, 2005 and is incorporated by reference herein in its entirety.

FIELD OF THE INVENTION

The invention relates to a process for applying material to a component, to a fiber and to a fiber mat.

BACKGROUND OF THE INVENTION

Recesses which have to be filled in components are often filled with a solder, but the solder has lower mechanical strength characteristics than the base material of the component.

An improved solder is known from U.S. Pat. No. 5,666,643. However, the short fibers used therein do not produce the desired increase in mechanical strength.

SUMMARY OF THE INVENTION

Therefore, it is an object of the invention to overcome this problem.

The object is achieved by the process, by the fiber and by the fiber mat as claimed in the claims.

The dependent claims list further advantageous measures which can be combined with one another in any desired, advantageous way.

DETAILED DESCRIPTION OF THE INVENTION

Component and Fiber Mat

Figure 1:
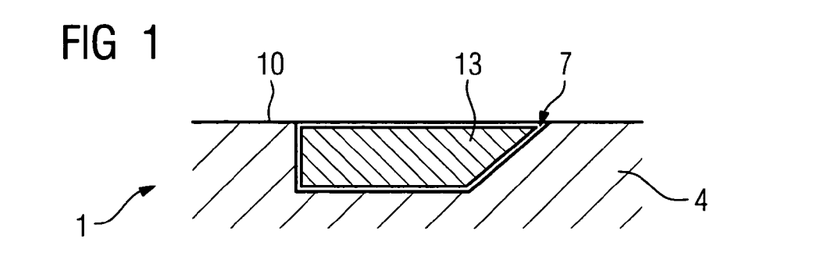
FIGS. 1 to 4 show how a recess is filled in accordance with the invention.

FIG. 1 shows a component 1, comprising a substrate 4 with a surface 10 which has, for example, a recess 7 in the substrate 4.

Figure 13:
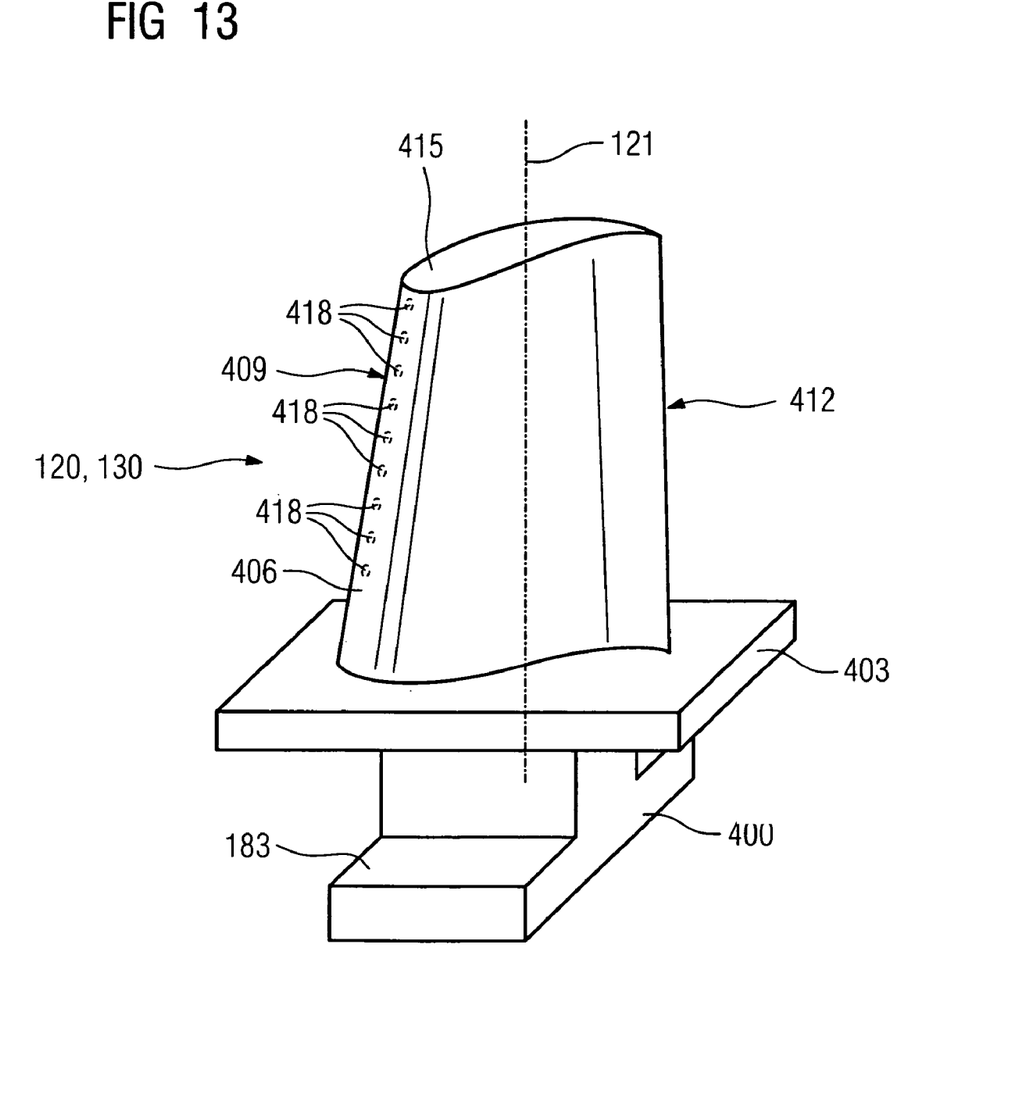
FIG. 13 shows a turbine blade or vane.
Figure 14:
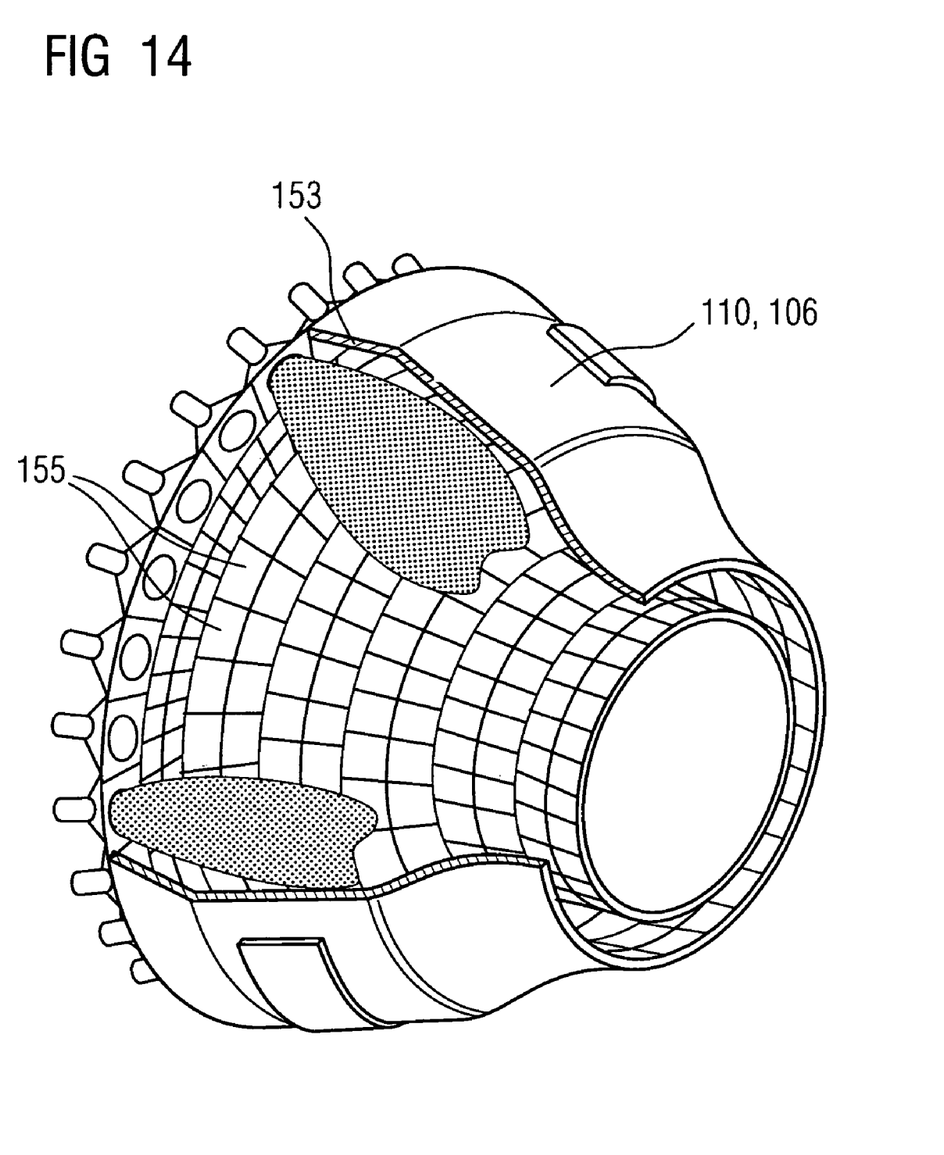
FIG. 14 shows a combustion chamber.
Figure 15:
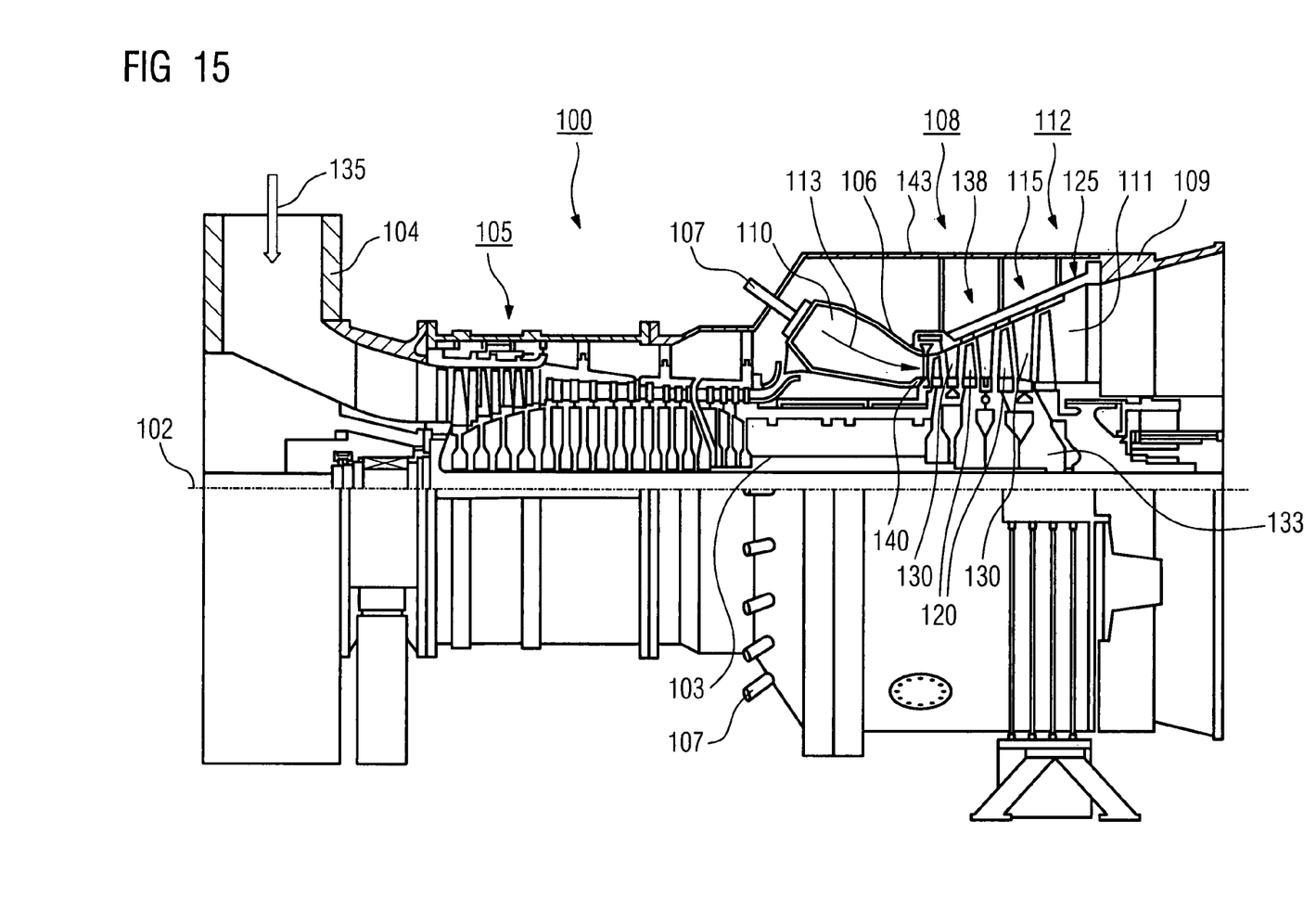
FIG. 15 shows a gas turbine.

The component 1 may be a component of a turbine, in particular of a steam turbine or gas turbine 100 (FIG. 15). The components are then, for example, turbine blades or vanes 120, 130 (FIG. 13), heat shield elements 155 (FIG. 14) or other housing parts 138 (FIG. 15), which consist, for example, of nickel-base, cobalt-base and/or iron-base superalloys.

In particular in the case of the refurbishment of used components 1, but also during the production of new components, recesses 7 in which, for example, a crack or defect was present have to be filled.

It is also possible for a coating or thickened portion to be applied over a large area, since the component 1, for example in a defined region, does not have or no longer has the required thickness or wall thickness (in the case of a hollow component).

The recess 7 is filled with at least one fiber mat 13.

Adapting the Fiber Mat to the Recess

FIGS. 1 to 4 show how the at least one fiber mat 13', 13", 13''' is adapted to the recess 7.

The single fiber mat 13 in FIG. 1, which shows a cross section through the substrate 4, the recess 7 and the fiber mat 13, reveals that the fiber mat 13 is adapted to the shape of the recess 7.

Figure 2:
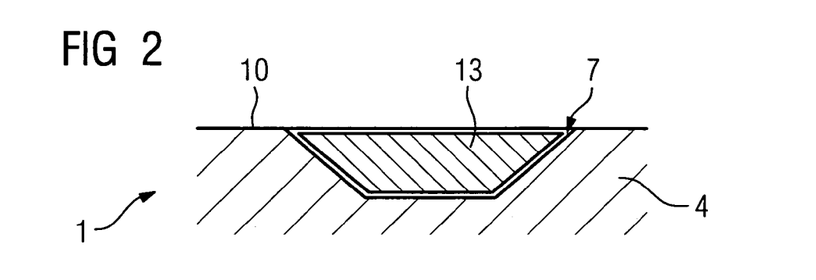
Figure 3:
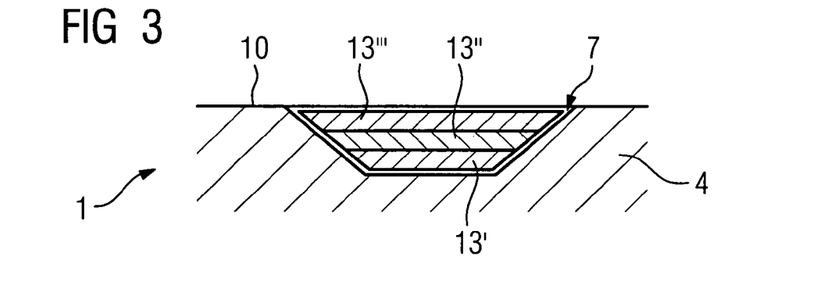

In FIG. 2, the recess 7 is, for example, trapezoidal in cross section, and therefore the fiber mat 13 is preferably likewise trapezoidal in cross section.

Alternatively, it is also possible for a plurality of fiber mats 13', 13", 13''' to be introduced into the recess 7 on top of one another (FIG. 3) and/or next to one another (not illustrated), these mats having different dimensions, with their lateral extent being adapted to the recess 7 in such a way that the recess 7 is filled as completely as possible.

Figure 4:
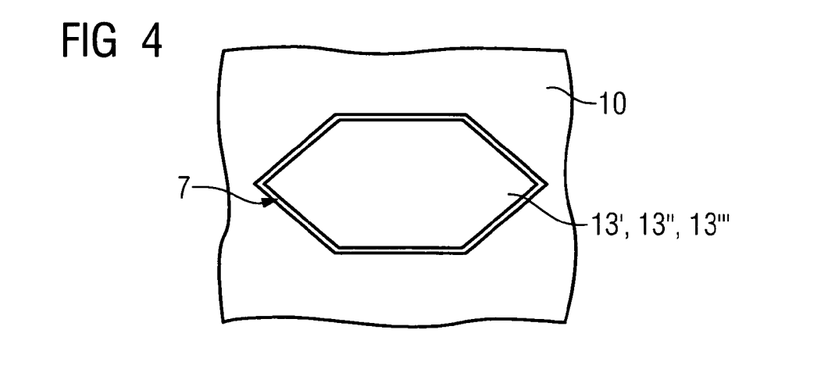

FIG. 4 shows a plan view of a recess 7 which has been filled with a single fiber mat 13 or a plurality of fiber mats 13', 13", 13'''. It can be seen from this that the lateral extent of the fiber mats 13, 13', 13" is also adapted to the recess 7.

Introduction of Material Into a Fiber Mat

Figure 5:
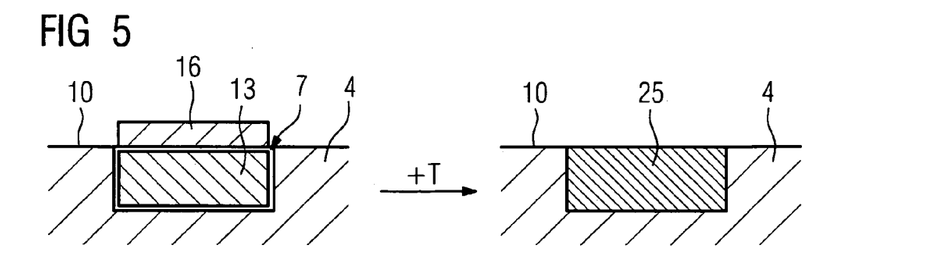
FIGS. 5 to 12 show process steps in accordance with the invention.

FIG. 5 shows how material 16 is introduced into the recess 7.

First of all, the recess 7 is filled with a single fiber mat 13. Then, in a further process step, a metallic material 16, in particular a material such as or similar to the material of the substrate 4, i.e. for example a superalloy, for example in paste or slurry form, is applied to the single fiber mat 13.

As a result of a heat treatment, i.e. an increase in temperature (+T), the metallic material 16 melts and infiltrates the fiber mat 13, thereby completely filling the fiber mat 13 in the recess 7 and forming a region 25 which has a high strength and good attachment to the component 1.

Figure 6:
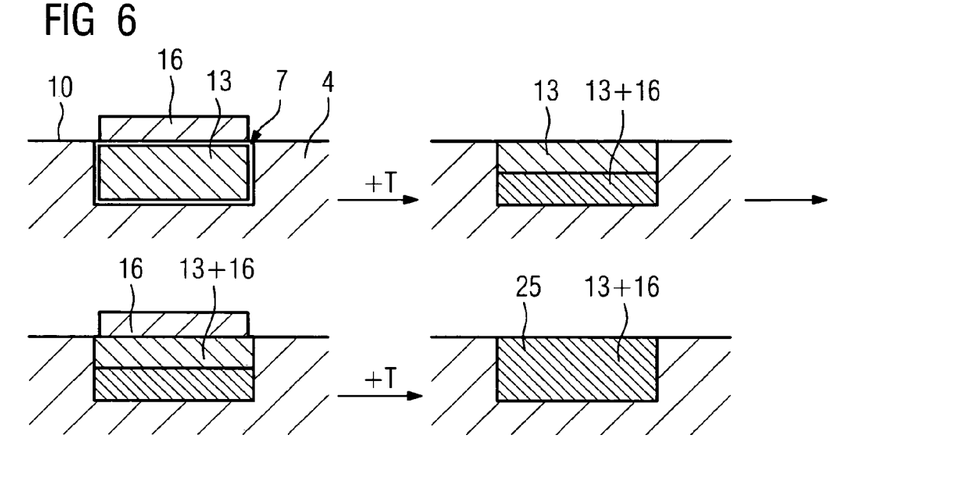

The one metallic material 16 of one composition may also be introduced into the single fiber mat 13 in two or more steps (FIG. 6).

This is required, for example, if the viscosity of the material 16 is too low and the material 16 is too prone to reaching regions of the surface 10 which are not to be provided with metallic material 16.

Therefore, only some of the material 16 which is required to completely fill the recess 7 and the fiber mat 13 is applied to the single fiber mat 13 and made to infiltrate it by means of a heat treatment. After this step, the lower region of the fiber mat 13 has been filled with metallic material 16.

In a second or further process step, further material 16 is applied to the fiber mat 13, and a heat treatment is again used to introduce the material 16 into the remaining region of the fiber mat 13 which is to be filled, so that in a final process step the recess 7 and the fiber mat 13 have been completely filled with material (FIG. 6).

Figure 7:
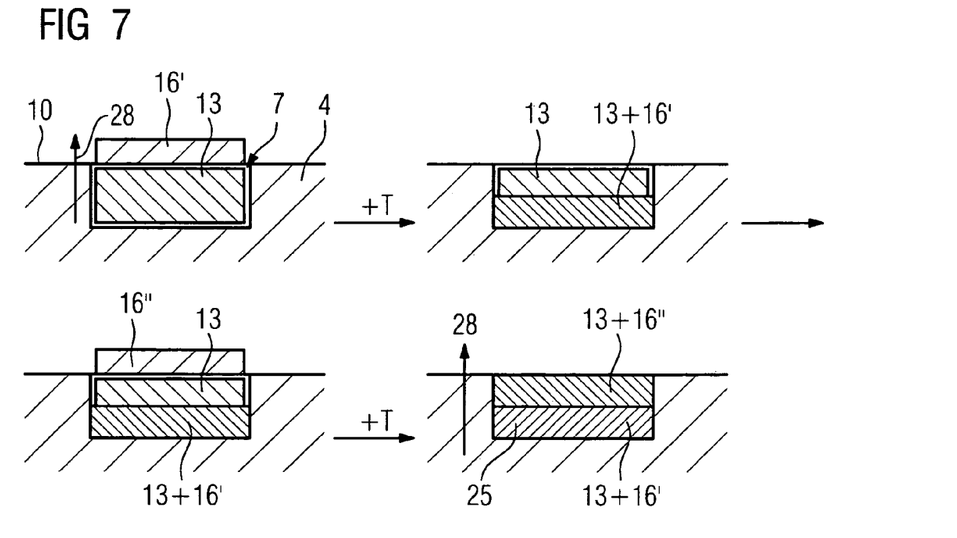

This stepwise approach to filling the single fiber mat 13 can also be utilized to produce a gradient in the composition of the metallic material 16', 16". A gradient of this type may be present, for example, in the case of an agent for reducing the melting point, which for example forms part of the material 16', 16" (FIG. 7).

For example, in this way the lower region of the fiber mat 13 has a higher content of at least one agent for reducing the melting point, for example boron, silicon, titanium, hafnium and/or zirconium, in order to achieve good attachment to the substrate 4. Toward the outside, the proportion of the agent for reducing the melting point is reduced, or even this agent is no longer present at all, in order to achieve a higher mechanical strength in the outer region. In this case, therefore, there is a gradient of the agent for reducing the melting point which runs in a direction 28 from the inside outward.

It is in this case preferable to use a single agent for reducing the melting point, preferably boron. It is also possible to produce a gradient of one or more other constituents of the metallic material, i.e. including an alloy.

Introduction of Material Into a Plurality of Fiber Mats

Figure 8:
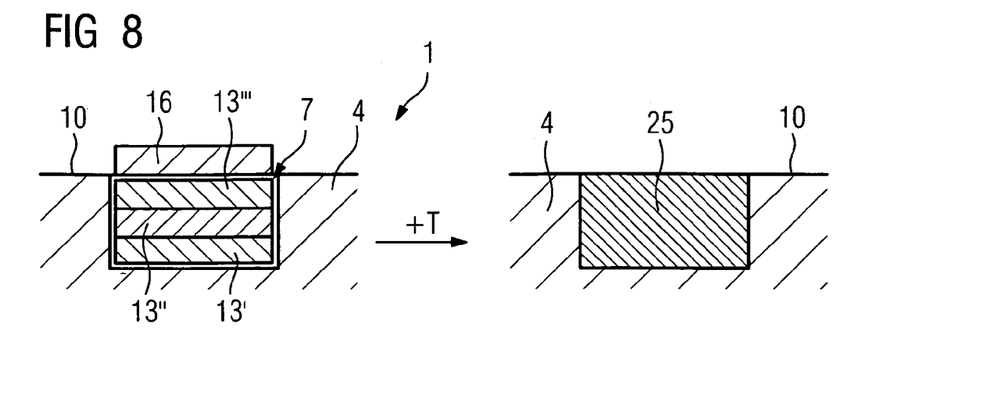

It is likewise possible for the recess 7 of the component 1 to be filled with a plurality of fiber mats 13', 13", 13''' and to be infiltrated and filled with a single metallic material 16, as has already been explained in FIG. 5 or in FIG. 6 (FIG. 8).

Figure 9:
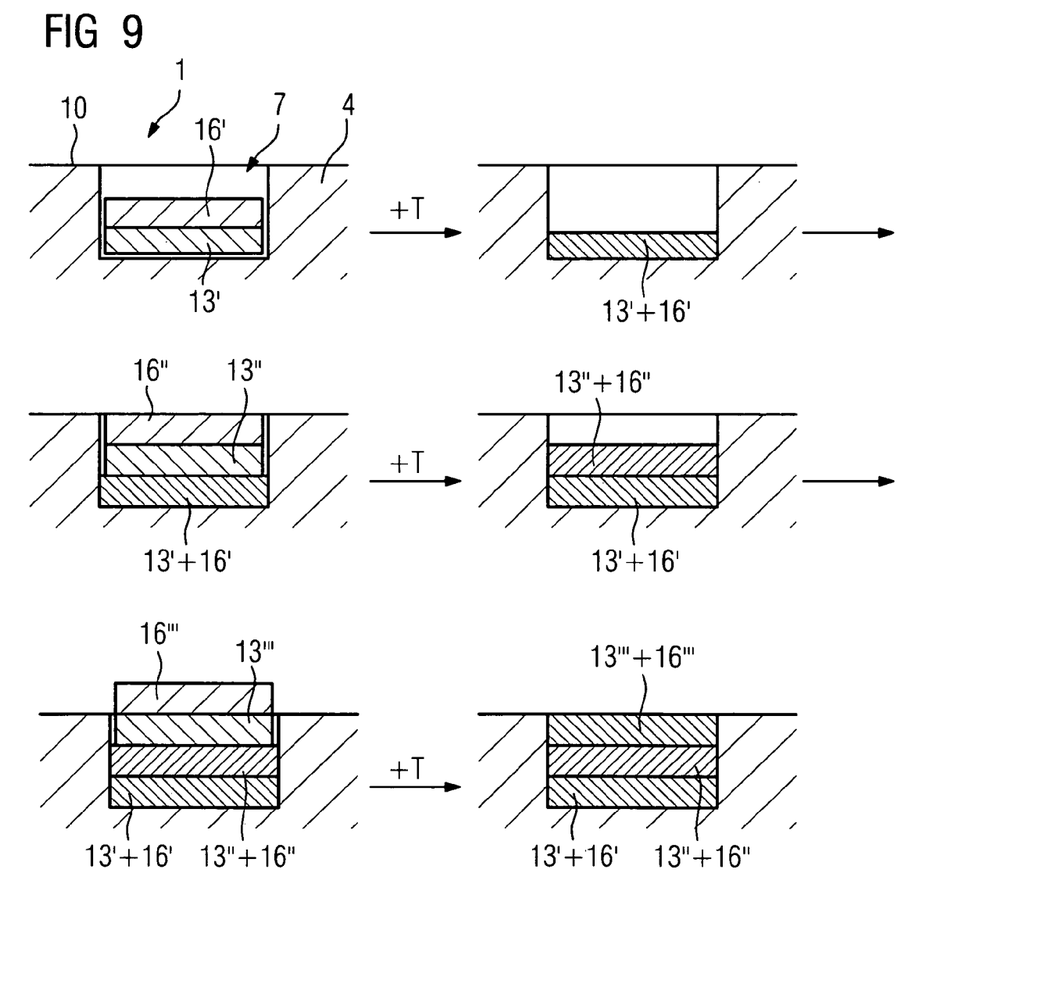

Furthermore, if a plurality of fiber mats 13', 13", 13''' are used, it is possible for the material to be introduced in steps (FIG. 9).

In this case, first of all the first fiber mat 13' is introduced into the recess 7, and a first metallic material 16' is applied and made to infiltrate into the fiber mat 13'.

Then, the second or further fiber mat 13" is applied to the fiber mat 13' which has been filled with metallic material 16', and this second or further fiber mat 13" is filled with a metallic material which is the same as that used in the first step 16', or with a second material 16", which differs from the first material 16'. It is in this case once again, as described above, possible to produce a concentration gradient in the composition.

Filling of the Recess Without Infiltration

Figure 10:
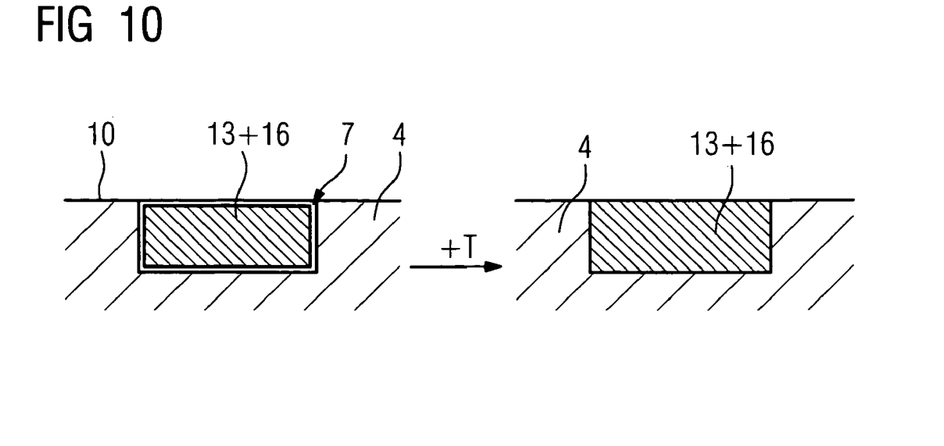

It is also possible for the one metallic material 16 or a plurality of metallic materials 16', 16" to be present in the single fiber mat 13 from the outset, by virtue of it already having infiltrated into the fiber mat 13 by means of a slurry or melting. The fiber mat 13 which has been filled with metallic material 16 in this way is introduced into the recess 7, and the heat treatment (+T) produces a good bond between the fiber mat 13 and the substrate 4 (FIG. 10).

Figure 11:
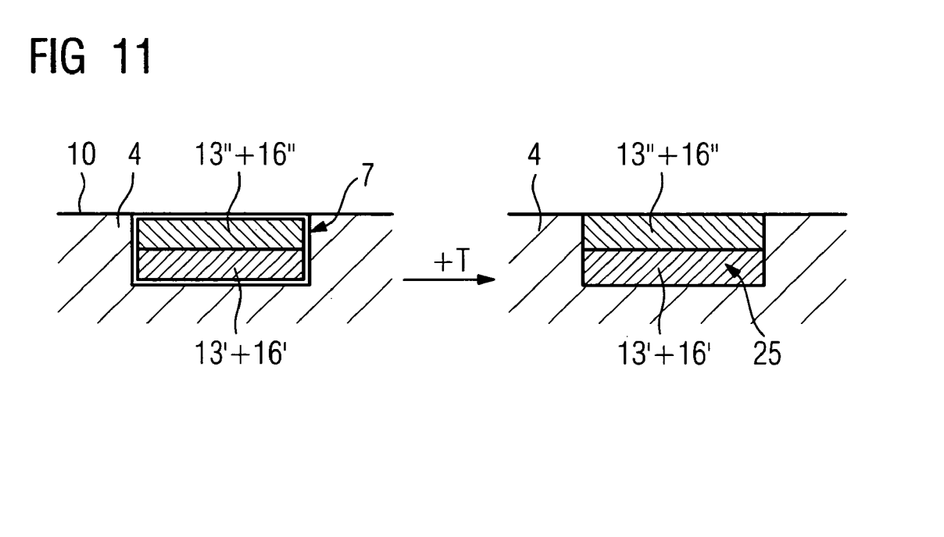

This procedure can also be carried out using a plurality of fiber mats 13', 13", the respective fiber mats 13', 13" already having a metallic material 16 or 16", which may be identical or different (FIG. 11).

In this case, the fiber mats 13', 13" which have been filled with metallic material are stacked in the recess 7, and good bonding of the fiber mats to the substrate 4 is achieved by means of an increase in temperature.

The invention is not restricted to three fiber mats or three different materials.

The fiber mats consist of metallic and/or ceramic fibers. It is preferable to use ceramic fibers. In particular, it is also possible to use boron fibers.

Figure 12:
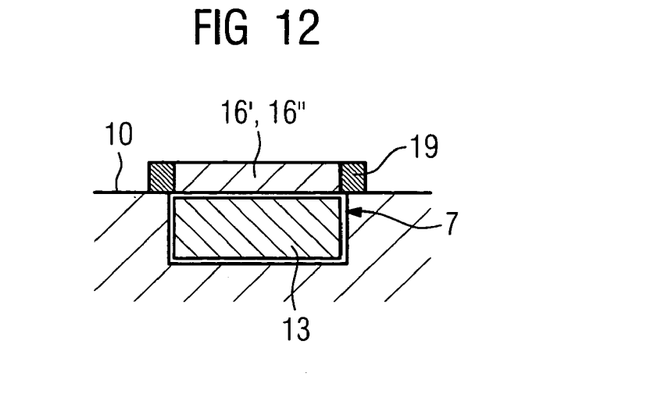

It is particularly advantageous if a stop-off region 19 (FIG. 12) is present in an outer region of the fiber mat 13, 13', 13", 13''', which stop-off region 19 prevents the metallic material 16, 16' from reaching the remaining surface 10 of the substrate 4. This stop-off region 19 contains, for example, nickel and/or aluminum oxide, in particular as powder in paste form.

Fiber

The fiber used to form the fiber mat 13, 13', 13" is produced in particular from a polysiloxane resin. Polysiloxane resins are polymer-ceramic precursors of the structural formula $XSiO_{1.5}$, where X may be —$CH_3$, —CH, —$CH_2$, —$C_6H_5$, etc. Drawn fibers are thermally crosslinked, with inorganic constituents (Si—O—Si chains) and organic side chains predominantly comprising X being present beside one another. Then, the fibers are ceramicized by means of a heat treatment in Ar, $N_2$, air or vacuum atmosphere at temperatures between 600° C. and 1200° C. The polymeric network is in the process broken down and restructured, via intermediate thermal stages, from amorphous to crystalline phases, with a Si—O—C network being formed from polysiloxane precursors.

Fibers may also be produced from precursors of the polysilane type (Si—Si), polycarbosilane (Si—C), polysilazane (Si—N) or polyborosilazane (Si—B—C—N) type.

It is preferable for the polysiloxane also to contain a further element which can bond very securely to the silicon or carbon atoms of the polysiloxane. This is, for example, boron. This element can then be included in the metallic material 16, 16', 16", 16''' which is used to infiltrate the fiber mat 13, 13', 13", 13''' formed from these fibers.

FIG. 8 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy. The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure.

The blades or vanes 120, 130 may likewise have coatings protecting against corrosion or oxidation (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a thermal barrier coating, consisting for example of $ZrO_2$, $Y_2O_4$—$ZrO_2$, i.e. unstabilized, partially stabilized or fully stabilized by yttrium oxide and/or calcium oxide and/or magnesium oxide, to be present on the MCrAlX.

Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sandblasting). Then, the corrosion and/or oxidation layers and products are removed. If appropriate, cracks in the component 120, 130 are also repaired by means of the process according to the invention. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

FIG. 9 shows a combustion chamber 110 of a gas turbine 100. The combustion chamber 110 is configured, for example, as what is known as an annular combustion chamber, in which a multiplicity of burners 107 which produce flames 156 and are arranged circumferentially around the axis of rotation 102, open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 made from an alloy is equipped with a particularly heat-resistant protective layer (MCrAlX layer and/or ceramic coating) or is made from a material that is able to withstand high temperatures (solid ceramic blocks).

These protective layers may be similar to the turbine blades or vanes, i.e. for example in the case of MCrAlX: M is at least one element selected from the group consisting of iron (Fe), cobalt (Co), nickel (Ni), X is an active element and represents yttrium (Y) and/or silicon and/or at least one rare earth element, or hafnium (Hf). Alloys of this type are known from EP 0 486 489 B1, EP 0 786 017 B1, EP 0 412 397 B1 or EP 1 306 454 A1, which are intended to form part of the present disclosure with regard to the chemical composition of the alloy.

It is also possible for a, for example, ceramic thermal barrier coating, consisting for example of $ZrO_2$, $Y_2O_4$—$ZrO_2$, i.e. unstabilized, partially stabilized or fully stabilized by yttrium oxide and/or calcium oxide and/or magnesium oxide to be present on the MCrAlX coating.

Columnar grains are produced in the thermal barrier coating by means of suitable coating processes, such as for example electron beam physical vapor deposition (EB-PVD).

Refurbishment means that after they have been used, protective layers may have to be removed from heat shield elements 155 (e.g. by sandblasting). Then, the corrosion and/or oxidization layers and products are removed. If appropriate, cracks in the heat shield element 155 are also repaired. This is followed by recoating of the heat shield elements 155, after which the heat shield elements 155 can be reused.

Moreover, on account of the high temperatures in the interior of the combustion chamber 110, a cooling system can be provided for the heat shield elements 155 and/or for their holding elements. The heat shield elements 155 are in this case, for example, hollow and may also have film-cooling holes (not shown) opening out into the combustion chamber space 154.

FIG. 10 shows, by way of example, a partial longitudinal section through a gas turbine 100.

In the interior, the gas turbine 100 has a rotor 103 with a shaft 101 which is mounted such that it can rotate about an axis of rotation 102 and is also referred to as a turbine rotor.

An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103.

The annular combustion chamber 106 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they have to be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure with regard to the chemical composition.

It is also possible for a thermal barrier coating, consisting for example of $ZrO_2$, $Y_2O_4$—$ZrO_2$, i.e. unstabilized, partially stabilized or completely stabilized by yttrium oxide and/or calcium oxide and/or magnesium oxide, to be present on the MCrAlX.

Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

LIST OF DESIGNATIONS

1 Component
4 Substrate
7 Recess
10 Surface
13, 13', 13", 13''' Fiber mat
16, 16', 16", 16''' Material, paste
19 Stop-off region
25 Region
28 Direction
100 Gas turbine
101 Shaft
102 Axis of rotation
103 Rotor
104 Intake housing
105 Compressor
107 Burner
108 Turbine
109 Exhaust-gas housing
110 Combustion chamber
111 Hot-gas passage
112 Turbine stages
113 Working medium
115 Row of guide vanes
120 Rotor blade
121 Longitudinal axis
125 Row of rotor blades
130 Guide vane
133 Turbine disk
135 Air
138 Inner housing
140 Securing ring
143 Stator
153 Combustion chamber wall
154 Combustion chamber space
156 Flames
155 Heat shield element
183 Blade or vane root
400 Securing region
403 Blade or vane platform
406 Main blade or vane part
409 Leading edge
412 Trailing edge
415 Blade or vane tip
418 Film-cooling holes
M Working medium
+T Increase in temperature

The invention claimed is:

1. A process for applying material to a solid metallic component, comprising:
    applying a fiber mat within a recess of the solid metallic component;
    applying a metallic paste or slurry material to the fiber mat;
    permeating the metallic material into the fiber mat;
    attaching the fiber mat permeated with the metallic material to the solid metallic component within the recess so as to fill the recess with the fiber mat permeated with the metallic material.

2. The process claimed in claim 1, wherein the metallic material is arranged in the fiber mat prior to applying the mat to the solid metallic component.

3. The process claimed in claim 1, wherein the recess of the solid metallic component comprises one of a crack or a defect.

4. The process claimed in claim 1, wherein a plurality of fiber mats are applied.

5. The process claimed in claim 4, wherein a plurality of metallic materials permeate into the fiber mat.

6. The process claimed in claim 5, wherein a first metallic material permeates a first fiber mat, and a second metallic material permeates a second fiber mat.

7. The process claimed in claim 6, wherein:
    the first and second fiber mats comprise a plurality of fiber mats,
    the second fiber mat is placed over the first fiber mat after the first metallic material permeates a first fiber mat and the second fiber mat covers the first fiber mat, and
    the fibers comprising the fiber mats have different concentrations of an element, to produce a concentration gradient of the element when a plurality of fiber mats are placed one on top of another.

8. The process claimed in claim 7, wherein a plurality of different metallic materials having different chemical compositions permeate the fiber mat to produce a concentration gradient in a direction along the fiber mat.

9. The process claimed in claim 8, wherein a melting point reducing agent is contained in or on the fibers of the fiber mat or in the metallic material.

10. The process claimed in claim 9, wherein the concentration of the melting point reducing agent forms a gradient.

11. The process claimed in claim 10, wherein there is a gradient in the concentration of a single agent for reducing the melting point.

12. The process as claimed in claim 11, wherein the agent for reducing the melting point is boron.

13. The process claimed in claim 12, wherein the metallic material permeates the fiber mats and attaches to the metallic component and to the fiber mats due to a heat treatment process.

14. The process claimed in claim 13, wherein a plurality of aluminum oxide or nickel containing stop-off regions arranged at the outer edge portion of a fiber mat prevent the metallic material from touching other portions of the component surface.

* * * * *